US010724367B2

(12) United States Patent
Cao Minh (10) Patent No.: US 10,724,367 B2
(45) Date of Patent: Jul. 28, 2020

(54) ESTIMATION OF FLUID PROPERTIES FROM WELL LOGS

(71) Applicant: Schlumberger Technology Corporation, Sugar Land, TX (US)

(72) Inventor: Chanh Cao Minh, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 120 days.

(21) Appl. No.: 15/026,239

(22) PCT Filed: Oct. 2, 2014

(86) PCT No.: PCT/US2014/058847
§ 371 (c)(1),
(2) Date: Mar. 30, 2016

(87) PCT Pub. No.: WO2015/051133
PCT Pub. Date: Apr. 9, 2015

(65) Prior Publication Data
US 2016/0230549 A1 Aug. 11, 2016

Related U.S. Application Data

(60) Provisional application No. 61/886,178, filed on Oct. 3, 2013.

(51) Int. Cl.
*E21B 49/08* (2006.01)
*G01V 3/20* (2006.01)

(52) U.S. Cl.
CPC ............ *E21B 49/087* (2013.01); *E21B 49/08* (2013.01); *G01V 3/20* (2013.01)

(58) Field of Classification Search
CPC .......... G01V 3/18; G01V 3/20; E21B 49/087; E21B 49/08
See application file for complete search history.

(56) References Cited

U.S. PATENT DOCUMENTS

| | | | |
|---|---|---|---|
| 6,686,738 B2 * | 2/2004 | Edwards .................. | G01V 3/32 324/303 |
| 8,441,269 B2 | 5/2013 | Minh et al. | |
| 2005/0165553 A1 * | 7/2005 | Jammes ................... | G01V 3/38 702/11 |
| 2007/0143021 A1 | 6/2007 | Griffiths et al. | |

(Continued)

FOREIGN PATENT DOCUMENTS

WO  2015051133 A1  4/2015

OTHER PUBLICATIONS

International Search Report and the Written Opinion for International Application No. PCT/US2014/058847 dated Jan. 28, 2015.

(Continued)

*Primary Examiner* — Kyle R Quigley (57) ABSTRACT

A method for estimation of water properties and hydrocarbon properties in a subsurface formation includes acquiring a plurality of well log measurements from the subsurface formation. The water properties and the hydrocarbon properties are parameterized with respect to a selected set of well log measurements. A simultaneous or sequential inversion is performed to estimate the water properties and the hydrocarbon properties.

13 Claims, 9 Drawing Sheets (56) References Cited

U.S. PATENT DOCUMENTS

| | | |
|---|---|---|
| 2008/0114547 A1 | 5/2008 | Syngaevsky |
| 2010/0283490 A1 | 11/2010 | Minh et al. |
| 2011/0068788 A1* | 3/2011 | Minh ................. G01V 3/18 |
| | | 324/303 |
| 2012/0043966 A1* | 2/2012 | Montaron ............ G01V 5/104 |
| | | 324/324 |

OTHER PUBLICATIONS

Minh et al., Combining Resistivity and Capture Sigma Logs for Formation Evaluation in Unknown Water Salinity: A Case Study in a Mature Carbonate Field, SPE 135160-PA, Socitey of Petroleum Engineers Annual Technical Conference and Exhbibition, Florence, Italy, Sep. 20-22, 2010, Published SPE Reservoir Evaluation and Engineering, Aug. 2011.

* cited by examiner

ESTIMATION OF FLUID PROPERTIES FROM WELL LOGS

CROSS-REFERENCE TO RELATED APPLICATION

This application claims priority from U.S. Provisional Application 61/886,178, filed Oct. 3, 2013, which is incorporated herein by reference in its entirety.

BACKGROUND

This section of the present disclosure is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this context, not as admissions of prior art.

The present disclosure relates generally to techniques for estimating continuous fluid properties from well logs obtained within a subsurface Earth formation. Such fluid properties may include, for example, water salinity, water saturation, and hydrocarbon types and properties thereof.

Well logging instruments have long been used in wellbores to make, for example, formation evaluation measurements to infer properties of the formations surrounding the wellbore and the fluids in the formations. Common logging tools include electromagnetic (resistivity) tools, nuclear tools, acoustic tools, and nuclear magnetic resonance (NMR) tools, though various other types of tools for evaluating formation properties are also available. Early logging tools were run into a wellbore on a wireline cable after the wellbore had been drilled.

Modern versions of such wireline well logging instruments are still used extensively. However, as the demand for information while drilling a wellbore continued to increase, measurement-while-drilling (MWD) tools and logging-while-drilling (LWD) tools have since been developed. MWD tools typically provide drilling parameter information such as weight on the bit, torque, temperature, pressure, direction, and inclination. LWD tools typically provide formation evaluation measurements such as resistivity, porosity, NMR distributions, and so forth. MWD and LWD tools often have characteristics common to wireline tools (e.g., transmitting and receiving antennas, sensors, etc.), but are designed and constructed to endure and operate in the harsh environment of drilling.

In current volumetric estimation techniques, petrophysical properties of water and hydrocarbons are assigned assumed values and are input into a numerical solver for estimation of volumetric properties within a formation. Often, the petrophysical properties are not all known. For example, examples of unknown properties can include water salinity and varying hydrocarbon type/grade column. In these cases, formation testers can be used to collect fluid samples, perform downhole fluid analysis, or infer fluids type from pressure gradients. The outcome of any such analysis or testing depends on the selection of test depths, which inherently contains hypotheses of the fluids in place. Some known techniques provide for the estimation of continuous water salinity and/or saturation, but do not address the unknown hydrocarbon types and properties. Hence, there is a need for continuous estimates of water and hydrocarbon properties from well logs.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

The present disclosure relates to techniques for estimating fluid properties from well logs obtained within a subsurface Earth formation. Such fluid properties may include, for example, connate water salinity, water saturation, and hydrocarbon types and properties thereof. In certain embodiments, estimation of water salinity and saturation is provided together with estimation of hydrocarbon properties. As may be appreciated by those skilled in the art, water salinity information enables certain further analysis, such as tracking injected water, monitoring fluid flood fronts, improving reserves estimation, designing enhanced hydrocarbon recovery operations, and pinpointing test depths, among others. Hydrocarbon properties information allows analysis such as identifying hydrocarbon type (tar, heavy/light oil, condensate, gas, etc.), locating fluid contacts within a formation (water, oil, gas), improving reserves estimation, locating bypassed hydrocarbon bearing (and possibly productive) zones, understanding fluid history and guiding test depths, among others.

A method for estimation of water properties and hydrocarbon properties in a subsurface formation includes acquiring multiple well log measurements from the subsurface formation, parameterizing the water properties and the hydrocarbon properties with respect to a selected set of well log measurements, and performing a simultaneous inversion to estimate the water properties and the hydrocarbon properties.

Another method for estimation of water properties and hydrocarbon properties in a subsurface formation includes acquiring multiple well log measurements in the subsurface formation, parameterizing the water properties and the hydrocarbon properties with respect to a selected set of well log measurements, performing a sequential inversion to estimate the water properties and the hydrocarbon properties.

A system for characterizing subsurface formation fluid content is disclosed. The system includes multiple well logging sensors each measuring a different physical parameter of the subsurface formation at multiple depths of investigation from a wall of the a wellbore, a predetermined set of values of response of each of the well logging sensors to water having a plurality of values of salinity and hydrocarbon having a plurality of values of density, and means for determining volume of water and volume of hydrocarbon in the subsurface formation using measurements from the multiple well logging sensors and the predetermined sets of values.

As stated, the brief summary presented above is intended to familiarize the reader with certain aspects and contexts of embodiments of the present disclosure without limitation to the claimed subject matter.

Additional background information may be obtained from the following publications.

Determining Formation Properties While Drilling, C. Cao Minh, U.S. Pat. No. 8,441,269, grant date: May 14, 2013
Combining Resistivity and Sigma for Formation Evaluation in Unknown Water Salinity—A Case Study in a Mature Carbonate Field, Cao Minh et al, SPE 135160, SPE Reservoir Engineering and Evaluation Journal
Combining Resistivity and Capture Sigma Logs for Formation Evaluation in Unknown Water Salinity: A Case Study in a Mature Carbonate Field, SPE 135160, ATCE Florence, September 2010, SPE Reservoir Evaluation and Engineering Journal, August 2011.

DETAILED DESCRIPTION

One or more specific embodiments of the present disclosure are described below. These embodiments are merely examples of the presently disclosed techniques. Additionally, in an effort to provide a concise description of these embodiments, all features of an actual implementation may not be described herein. It should be appreciated that in the development of any implementation according to the present disclosure, as in any engineering or design project, numerous implementation-specific decisions are made to achieve the developer's specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill in the art having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1:
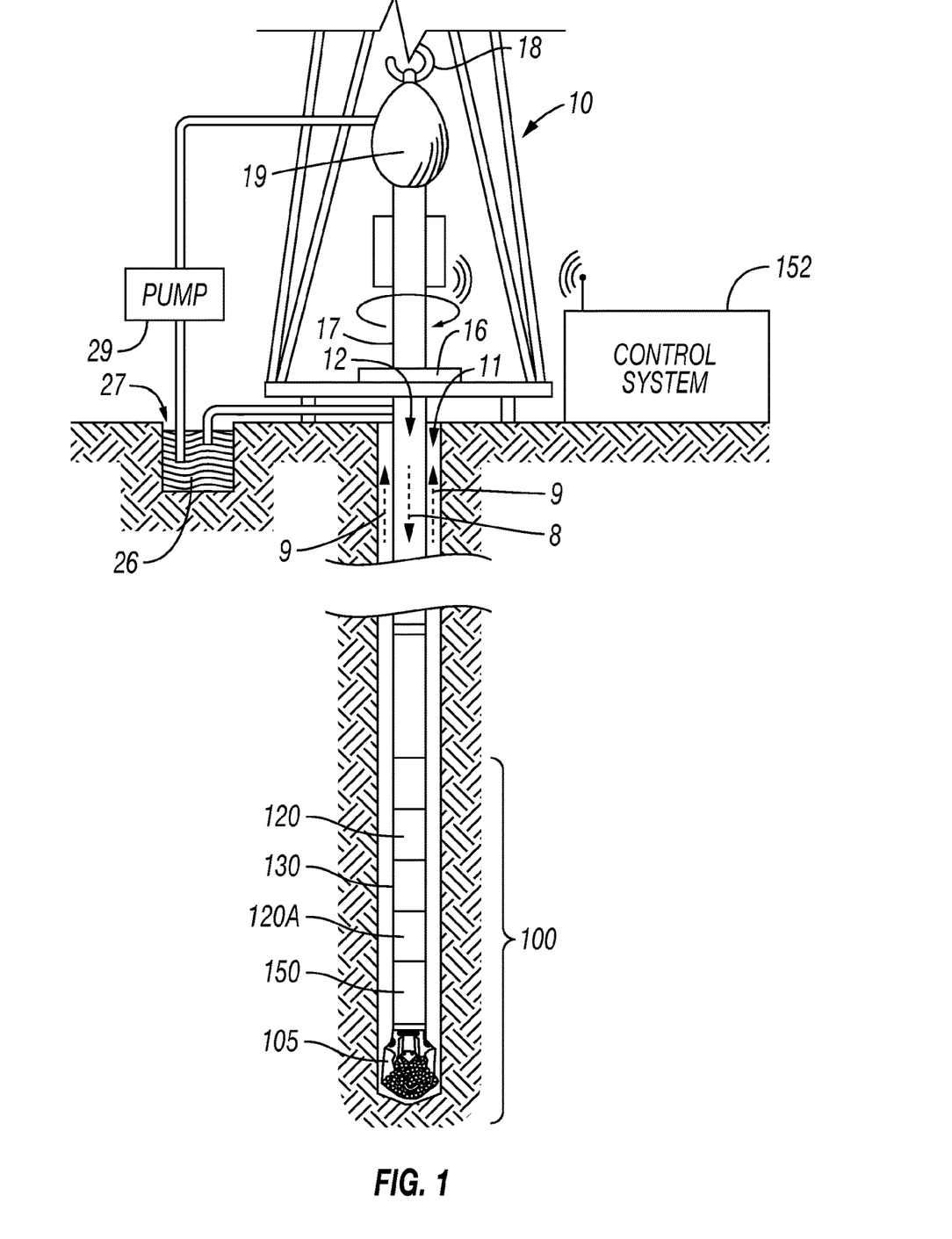
FIG. 1 represents a simplified view of a well site system.

FIG. 1 represents a simplified view of a wellsite system including a well logging instrument system in which various embodiments of methods according to the disclosure may be used. The well site system shown in FIG. 1 may be deployed either onshore or offshore. In the example system shown, a wellbore 11 is formed in subsurface formations by rotary drilling in a manner that is well known to those skilled in the art. Although the illustrated example shows a vertically drilled wellbore, some embodiments may also use directional drilling so that the wellbore is drilled along a selected geodetic trajectory.

A drill string 12 is suspended within the wellbore 11 and has a bottom hole assembly (BHA) 100 which includes a drill bit 105 at its lower end. A surface system includes a platform and derrick assembly 10 positioned over the wellbore 11, with the derrick assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is well known, a top drive system (not shown) could be used in other embodiments in order to rotate the drill string 12. Still other examples may use an hydraulic motor in the drill string to rotate the drill bit 105. Accordingly, the means used for rotating the drill string 12 and the drill bot 105 shown herein are not intended to limit the scope of the present disclosure.

Drilling fluid or mud 26 may be stored in a pit 27 formed at the well site. A pump 29 delivers the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid 26 exits the drill string 12 via ports in the drill bit 105, and then circulates upwardly through an annular space ("annulus") between the outside of the drill string 12 and the wall of the wellbore, as indicated by the directional arrows 9. In this known manner, the drilling fluid lubricates the drill bit 105 and carries formation cuttings up to the surface as it is returned to the pit 27 for recirculation, typically after treatment by removing cuttings and other contaminants.

The drill string 12 includes the previously described BHA 100. In the illustrated embodiment, the BHA 100 is shown as having one MWD module 130 and multiple LWD modules 120 (with reference number 120A depicting a second LWD module 120). As used herein, the term "module" as applied to MWD and LWD devices is understood to mean either a single instrument or a suite of multiple instruments contained in a single modular device. Additionally, the present example BHA 100 may include a rotary steerable directional drilling system (RSS) and/or steerable motor 150. The RSS and/or steerable motor 150 may be used in some embodiments to cause the wellbore to follow a planned geodetic trajectory.

The LWD modules 120 may be housed in one or more drill collars and may include one or more types of well logging instruments. The LWD modules 120 may include devices (not shown separately) for measuring, processing, and storing information, as well as for communicating with the surface equipment. By way of example, the LWD module 120 may include one or more types of logging instruments, such as a resistivity logging instrument, a nuclear logging instrument (e.g., and without limitation, natural gamma ray detectors, a gamma-gamma density instrument, a neutron porosity instrument and/or a pulsed neutron porosity/capture cross-section instrument), a nuclear magnetic resonance (NMR) logging tool, an acoustic logging tool, and a dielectric logging tool, among others. In some embodiments, the LWD module 120 may include a multifunction tool capable of multiple types of measurements, for example two or more of the foregoing types of instruments. As an example, in one embodiment, a multifunction tool may be capable of making resistivity measurements, neutron porosity measurements, natural gamma ray and gamma-gamma density measurements, neutron-gamma density, thermal neutron capture cross section (Sigma) measurements, and elemental spectroscopy. One specific example of a multifunction tool may be a type sold under the trademark ECOSCOPE, which is a trademark of Schlumberger Technology Corporation, Sugar Land, Tex. In other embodiments, separate respective well logging instruments may be provided in the BHA 100 in separate modules and/or drill collars for obtaining each of the above-mentioned measurements.

The MWD module 130 is also housed in a drill collar, and may contain one or more devices for measuring characteristics of the drill string and drill bit. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 further includes an apparatus (not shown) for generating electrical power for the downhole system. For example, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

The operation of the assembly 10 of FIG. 1 may be controlled using a control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for example, workflows and the like for carrying out a drilling operation, algorithms and routines for processing data received at the surface from the BHA 100 (e.g., as part of an inversion to obtain one or more desired formation parameters and/or as part of an algorithm to estimate continuous water salinity and/or saturation together with continuous hydrocarbon properties), among other functions.

As discussed above, embodiments of the present disclosure relate to techniques for estimating fluid properties from well logs obtained within a subsurface Earth formation. Such fluid properties may include, for example, water salinity, water saturation, and hydrocarbon types and properties thereof. In certain embodiments, estimation of water salinity and saturation (fractional volume of formation pore space occupied by water) is provided together with estimation of hydrocarbon properties.

In accordance with an aspect of the present disclosure, an embodiment for estimating water properties together with hydrocarbon properties may include the use of nuclear measurements together with resistivity measurements and NMR and/or dielectric measurements. In accordance with another aspect of the present disclosure, an embodiment for estimating water properties together with hydrocarbon properties does not require radial fluid partitioning into separate flushed and uninvaded zones when LWD measurements are used. In the case of invasion of a formation (e.g., by drilling mud filtrate), Sigma measurements may be corrected through a multiple depth of investigation (MDOI) Sigma inversion technique, and shallow depth of investigation (DOI) measurements, such as density, may be corrected for invasion effects. In accordance with yet another aspect of the present disclosure, an embodiment for estimating water properties together with hydrocarbon properties includes using water salinity/saturation estimations from other known estimation techniques to verify the results. In accordance with yet another aspect of the present disclosure, an embodiment for estimating water properties together with hydrocarbon properties includes parameterizing generic hydrocarbon properties in analytical form. In cases where a parameterization is not valid, a deterministic process may enable separately estimating hydrocarbon properties from a subset of logs of from a suite of individual logs.

As will be appreciated by those skilled in the art, the equations of the density ($\rho_b$), hydrogen index (HI), sigma ($\Sigma$) and true resistivity ($R_t$—resistivity of a formation in at a lateral distance from the wellbore beyond any effects of fluid invasion) measurements are shown below (in which the subscript g refers to rock grain or matrix, subscript h refers to hydrocarbon and subscript w refers to water):

$$\sum = (1-\phi_t) \cdot \sum_g + V_w \cdot \sum_w + V_h \cdot \sum_h$$

$$\rho_b = (1-\phi_t) \cdot \rho_g + V_w \cdot \rho_w + V_h \cdot \rho_h$$

$$HI = (1-\phi_t) \cdot HI_g + V_w \cdot HI_w + V_h \cdot HI_h$$

$$R_t = \frac{a \cdot R_w}{V_w^n \cdot \phi_t^{m-n}}$$

where total porosity ($\varphi_t$) is the sum of the water volume ($V_w$) and the hydrocarbon volume ($V_h$):

$$\varphi_t = V_w + V_h$$

and m, n are Archie exponents. The formation rock grain, or "matrix" properties are denoted with subscript g and may be estimated from elemental spectroscopy, for example, inelastic neutron induced gamma ray spectroscopy. The above equations are known in the art to be used to determine fluid volumes ($V_w$, $V_h$) with input (i.e., assumed) water properties ($\Sigma_w$, $\rho_w$, $HI_w$, $R_w$) and input (i.e., assumed) hydrocarbon properties ($\Sigma_h$, $\rho_h$, $HI_h$).

The water properties are various functions of salinity (chloride salt concentration), denoted by ppk, temperature t and pressure p:

$$\Sigma_w = f(ppk, p, t)$$

$$R_w = g(ppk, t)$$

$\rho_w = q(ppk,p,t)$ $HI_w = h(ppk,p,t)$

The hydrocarbon properties are also various functions of pressure and temperature, specific gas gravity SG, solution gas Rs, volume expansion factor Bo (or Bg for gas) and the hydrocarbon API gravity value or density:

$\Sigma_h = F(API, Rs, Bo, SG, p, t)$ $\rho_h = G(API, Rs, Bo, SG, p, t)$ $HI_h = H(API, p, t)$ The above equations show that to solve for more unknowns than conventional fluid volumetric equations ($V_w$, $V_h$) generally permit (e.g., solving for salinity ppk and hydrocarbon API values), one may parameterize the fluid properties. In other words, one can solve for both fluid volumes and fluid properties of both hydrocarbon and water.

Figure 2:
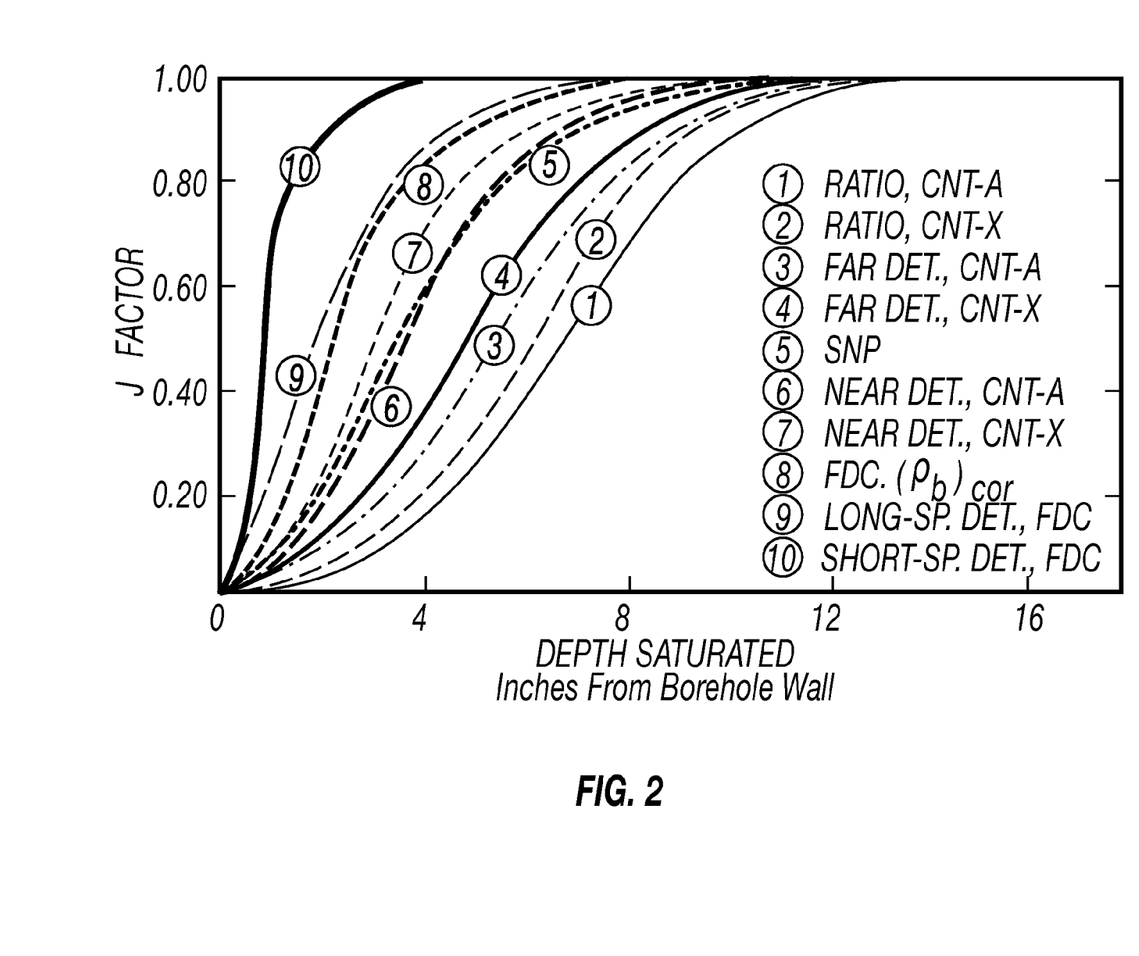
FIG. 2 shows graphs of the cumulative radial pseudogeometric factor J for various sensors with respect to distance from the wellbore wall.

FIG. 2 shows graphs of the cumulative radial pseudogeometric factor J for various sensors with respect to distance from the wellbore wall for several different types of nuclear well logging instruments. Shallow invasion affects mostly the density measurement as may be observed in FIG. 2 on curves A8, A9 and A10. At 2 inches into the formation, 50% of the density response comes from the flushed zone (J=0.5 for curve A8). However, for the neutron HI log (e.g., using the CNT-A or CNT-X instrument), less than 5% of the neutron response comes from the same radial depth flushed zone (J<0.05 for curve 1). The Sigma response function is similar to that of the neutron log. Thus for the density log, its corrected response, $\rho_{bc}$, may use instead:

$\rho_{bc} = J\rho_{xo} + (1-J)\rho_t$     (1)

$\rho_{xo} = \rho_{mf}\phi S_{xo} + \rho_h\phi(1-S_{xo}) + \rho_m(1-\phi)$     (2)

$\rho_t = \rho_w\phi S_w + \rho_h\phi(1-S_w) + \rho_m(1-\phi)$.     (3)

Where J is input, or may be determined from a shallow investigating resistivity array instruments (such as the MicroScope instrument sold by Schlumberger Technology Corporation) or sigma arrays (such as the EcoScope instrument sold by Schlumberger Technology Corporation, which measures MDOI Sigma). In the flushed zone, $S_{xo} \sim 1$ such that no extra variable need be introduced.

Figure 3A:
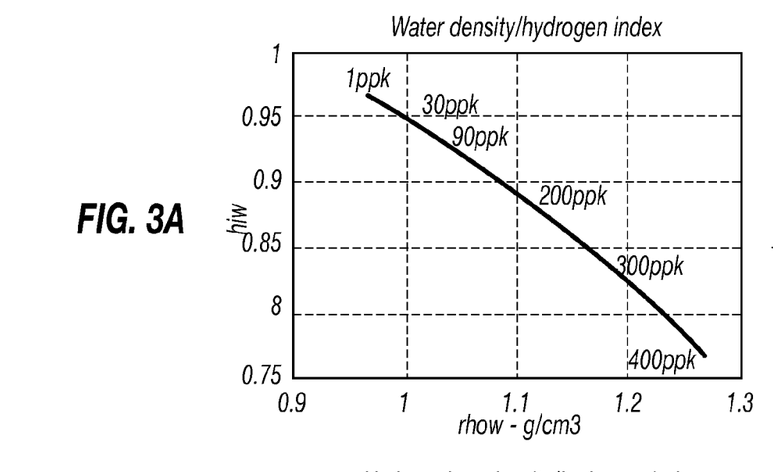
FIGS. 3A through 3D show graphs of parameterized water and hydrocarbon properties.
Figure 3B:
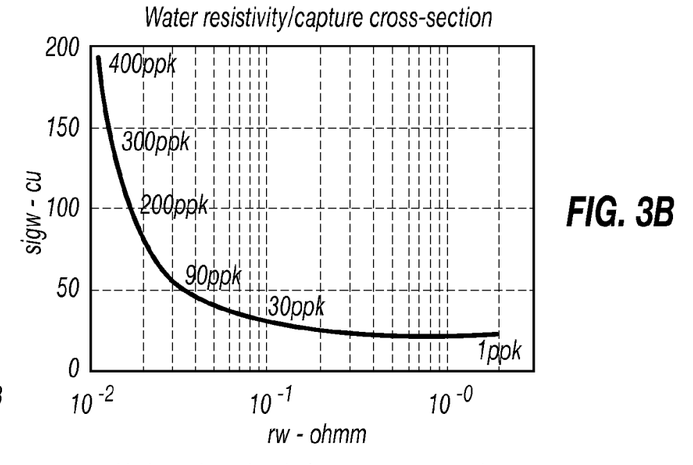
Figure 3C:
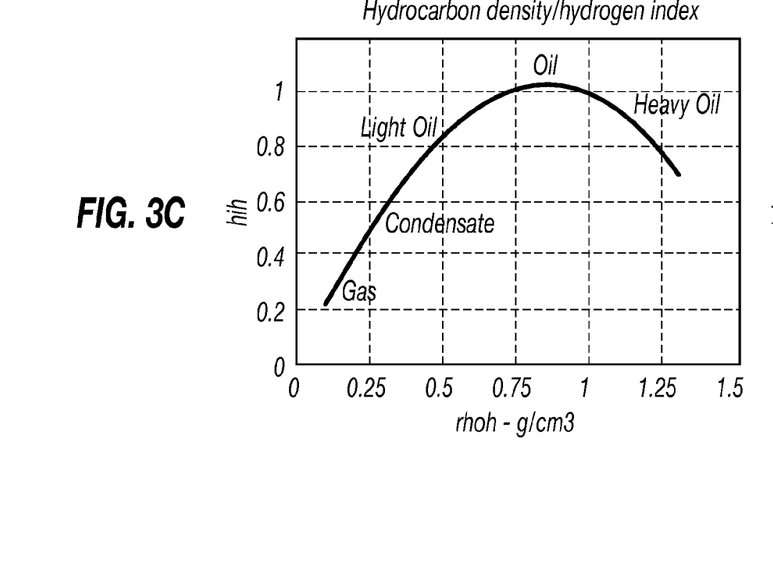
Figure 3D:
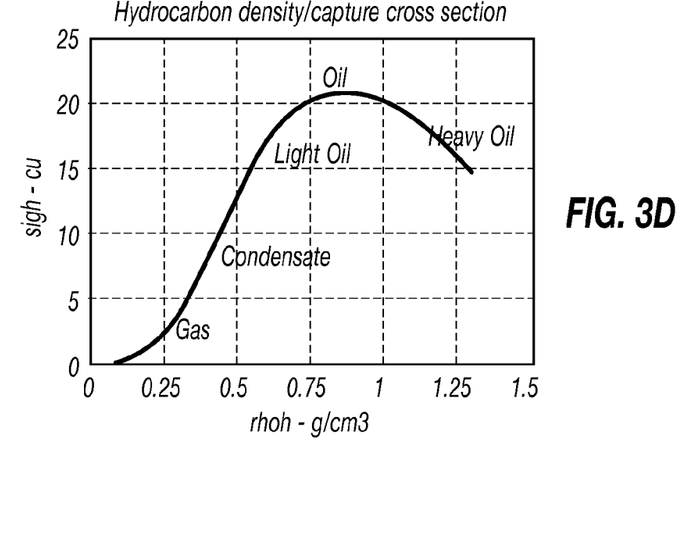

FIGS. 3A through 3D show an example where water is parameterized in terms of salinity ppk for a temperature of approximately 200 degrees F. and a pressure of approximately 3000 psi (FIGS. 3A and 3B). FIG. 3A shows, for various values of salinity, an expected value of HI for the water and ρ for the water. FIG. 3B shows expected values of water thermal neutron capture cross section (Sigma) and electrical resistivity with respect to salinity. Such parameterization may be determined, for example, by laboratory experiment, and the results stored in a lookup table or defined as parametric functions. The foregoing maybe stored in a database accessible by the control unit (152 in FIG. 1) or any other computer system used to make calculations according to various aspects of the present disclosure. An example of hydrocarbon parameterization in terms of density is shown in FIGS. 3C and 3D. FIG. 3C shows values of hydrogen index and density of various forms of hydrocarbon, while FIG. 3D shows expected values of thermal neutron capture cross section and density with respect to various types of hydrocarbon. The hydrocarbon types are indicated on the graphs and are generic because well known correlations may be used to estimate Bo, Rs, etc. from the hydrocarbon types at any selected pressure and temperature.

Two example processes are described below for estimation of water and hydrocarbon properties.

1. Simultaneous Inversion

In a first example embodiment, a system of equations is inverted for fluid volumes, water salinity, and hydrocarbon API gravity using a non-linear constrained multivariate inversion that may take the following form:

$$\min_x f(x) \text{ such that} \begin{cases} c(x) \le 0 \\ ceq(x) = 0 \\ A \cdot x \le b \\ Aeq \cdot x = beq \\ lb \le x \le ub \end{cases},$$

$$f(x) = \sum_{i=1}^{n} \lambda_i \left( \frac{M_i - \tilde{M}_i}{M_i} \right)^2$$

$x = [V_w, V_h, ppk, API]$ wherein $M_i$ is the n-measurements vector: HI (such as NMR, or epithermal or thermal neutron based HI to minimize the rock grain matrix effect), true sigma, true resistivity and density; $\tilde{M}_i$ is the theoretical, or reconstructed, log vector; and $\lambda_i$ is a measurement-weight vector in the cost function $f(x)$ (a zero value of weight eliminates an intentionally unused well log measurement in the inversion).

The variables m, n and $V_w$ from dielectric measurements may be included in the inversion process.

2. Sequential Inversion

In another example embodiment, a sequential inversion may be used. A sequential inversion may offer some advantages over the above-described simultaneous inversion. For example, in a sequential inversion, each step may deliver controllable solutions in the case of fluid complexity. For example, in instances where the joint resistivity-sigma inversion delivers good results in terms of salinity ppk and water volume $V_w$, these answers can be fixed and other logs may be used to invert jointly for hydrocarbon volumes and properties. In one example, a sequential inversion may be based on the following workflow:

1. Joint-resistivity/sigma inversion to determine $V_w$ and ppk
2. Joint-density/HI/sigma inversion to determine $V_h$ and API Another example where sequential inversion can be useful is when the hydrocarbon is too complex to be represented by the simple parameterization shown in FIGS. 3C and 3D. In this case, other log measurements can used individually to solve for hydrocarbon properties. Such a process can be outlined as follows:

1. Joint-resistivity/sigma inversion to determine $V_w$ and ppk
2. Density inversion to determine hydrocarbon density
3. HI inversion to determine hydrocarbon hydrogen index
4. Sigma inversion to determine hydrocarbon sigma In the foregoing processes, it should be apparent that having independent measurement of $V_w$, such as one derived from dielectric measurement, may help simplify the inversion and increase the robustness of the solution.

EXAMPLES

1. Carbonate Example

Figure 4:
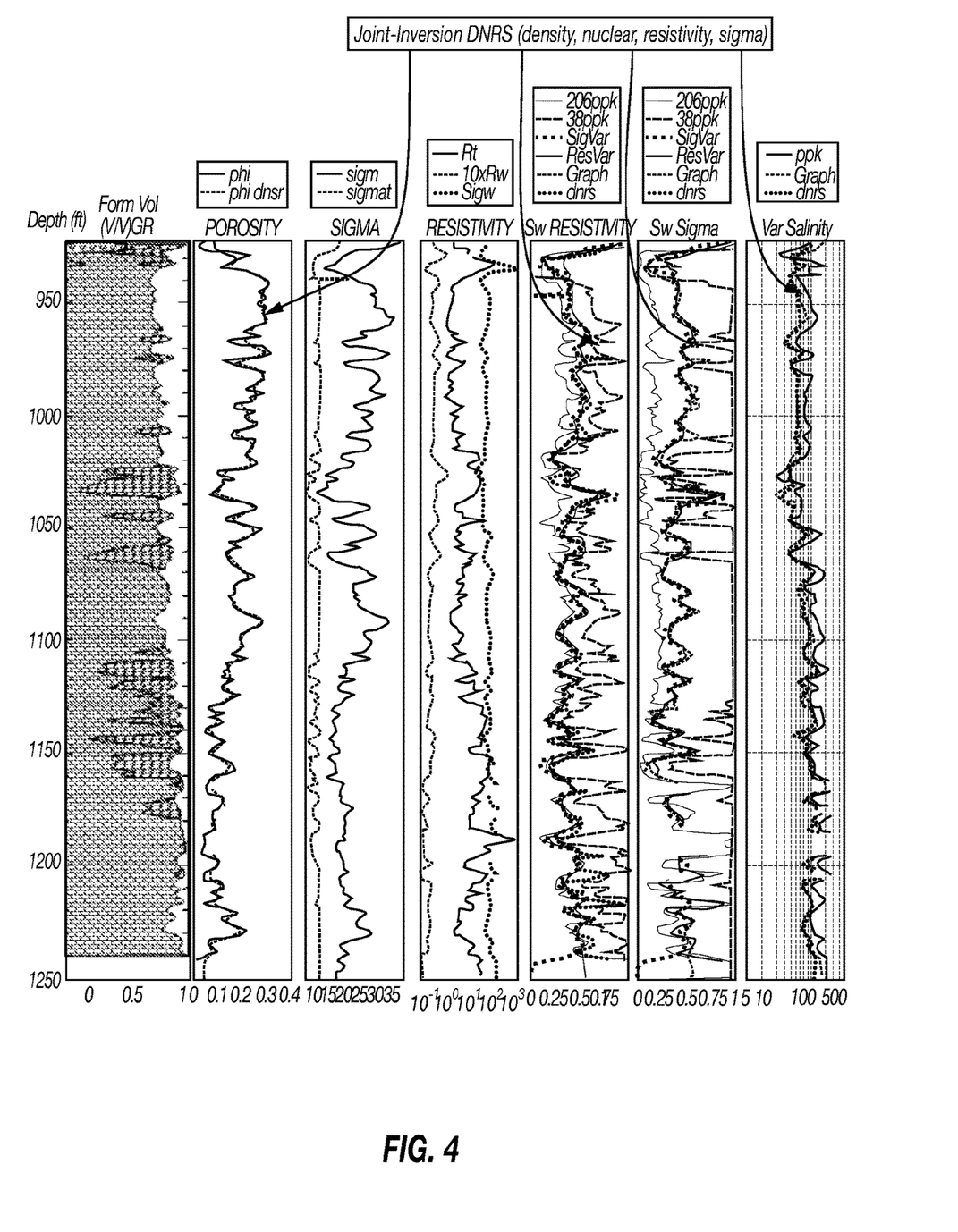
FIG. 4 shows a carbonate example showing the results of the density/HI/resistivity/sigma joint-inversion overlaid on the results of the resistivity-sigma joint-inversion.

A carbonate example showing the results of the density/HI/resistivity/sigma joint-inversion overlaid on the results of the resistivity-sigma joint-inversion (graphical method in dash and minimization in dot) may be observed in the example calculated log in FIG. 4

Figure 5:
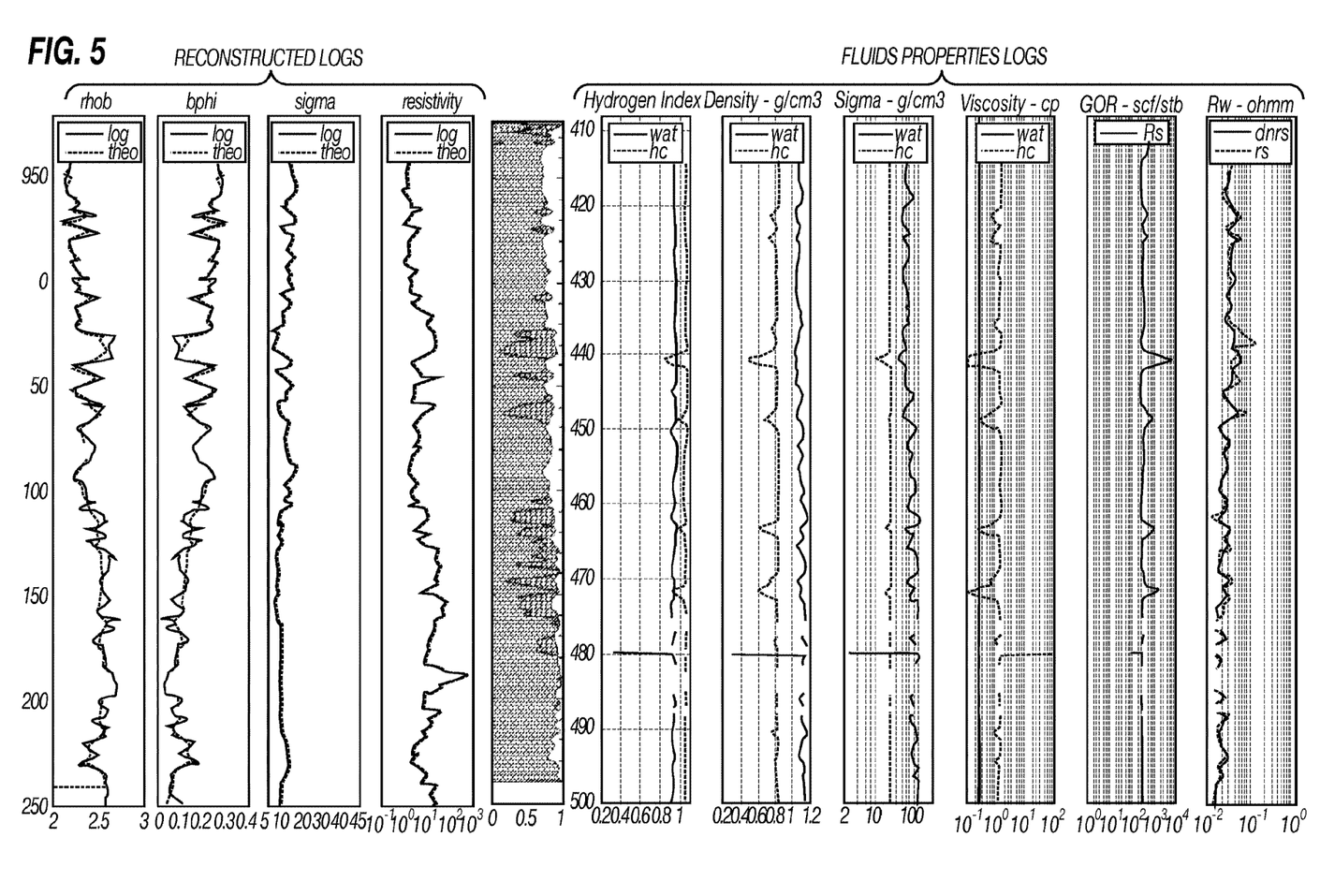
FIG. 5 shows example fluid properties logs (right panel) and reconstructed logs (left panel).

Fluid properties logs (right panel) and reconstructed logs (left panel) may be observed in FIG. 5. The rightmost track in FIG. 5 shows good agreement between Rw from the joint-inversion of density/HI/sigma/resistivity and Rw from the joint-inversion of resistivity/sigma

2. Clastics Example

Figure 6:
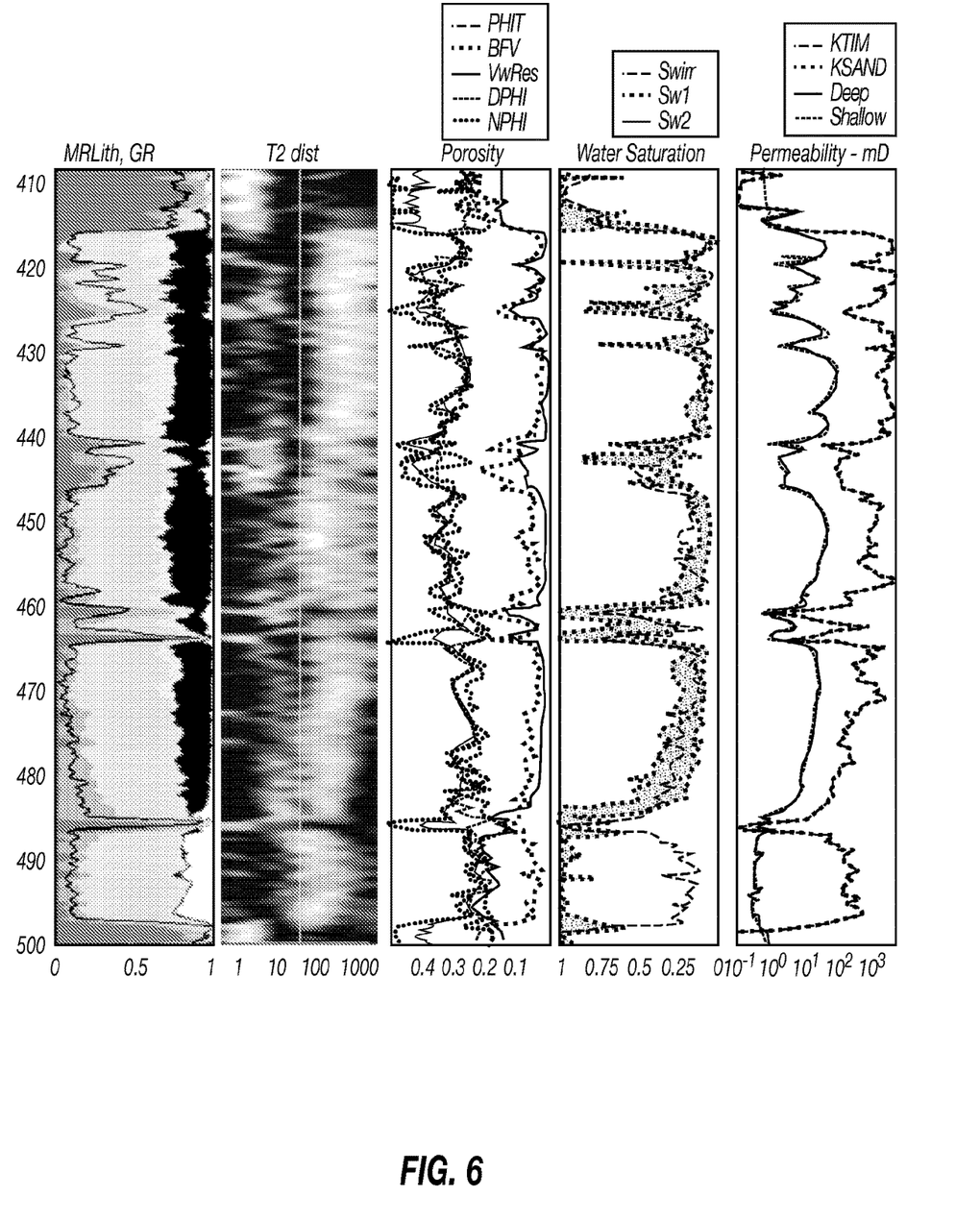
FIG. 6 shows an example HI log with 3 possible choices: thermal neutron porosity (TNPH), epithermal-like porosity (BPHI) and NMR porosity (MRP). The order of preference may dictated by the log measurement in inverse order of effects thereon of the formation rock matrix.

This example has measurement data acquired using Schlumberger's ECOSCOPE and PROVISION well logging instruments. As may be observed in FIG. 6, porosity track 3, the HI log now has 3 possible choices: thermal neutron porosity (TNPH), epithermal-like porosity (BPHI) and NMR porosity (MRP). The order of preference may dictated by the log measurement in inverse order of effects thereon of the formation rock matrix, e.g., MRP, then BPHI then TNPH in the present example. Adding NMR measurements may also provide a value of irreducible water volume $V_{wirr}$ that can be used to constrain the inversion in a hydrocarbon bearing formation.

Figure 7:
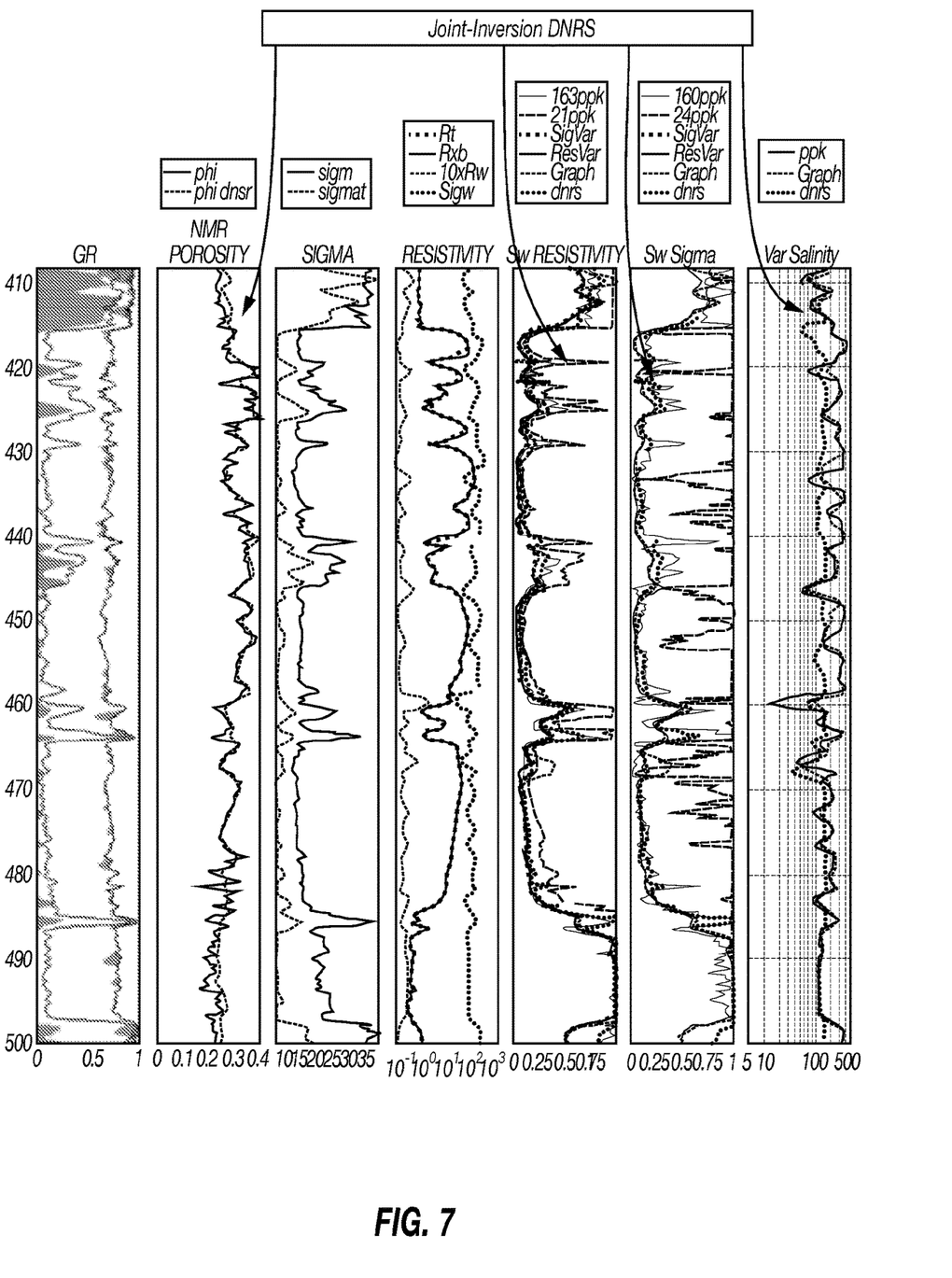
FIG. 7 shows a clastic formation example illustrating the results of the density/HI/resistivity/sigma joint-inversion overlaid on the results of the resistivity-sigma joint-inversion.
Figure 8:
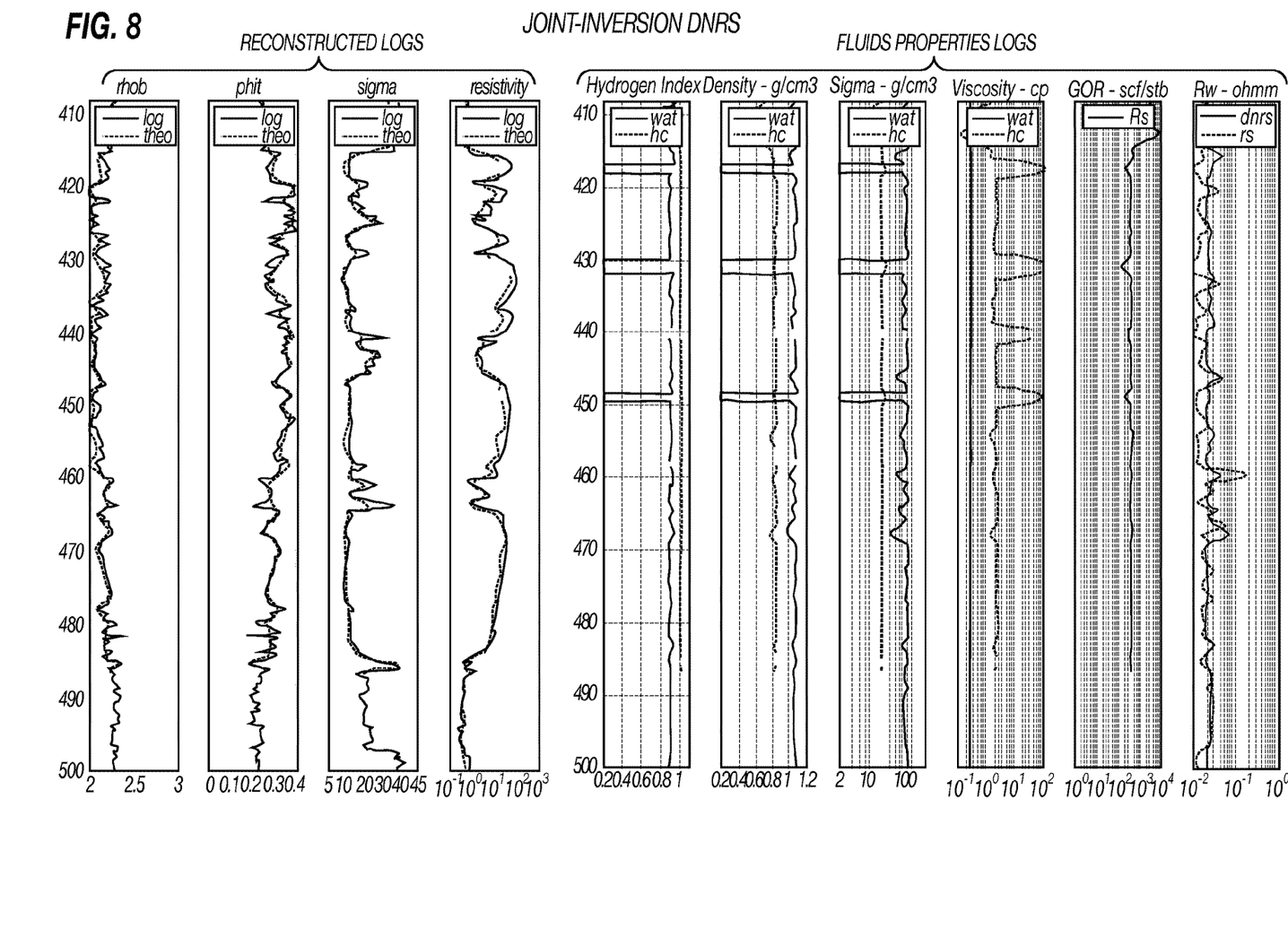
FIG. 8 shows a fluids properties log (right panel) and reconstructed logs (left panel).

3. EcoScope and proVISION Well Logging Instrument Data in a Clastics Example Inversion results using NMR are shown in FIGS. 7 and 8. In this example, because the hydrocarbon bearing zone resistivity is high, the weight of the resistivity in the inversion was decreased to demonstrate that the user can control the contribution of a particular log data type to the solution. As a result, FIG. 8 shows a reconstructed resistivity that does not overlay the measured resistivity.

FIG. 7 shows a clastic formation example illustrating the results of the density/HI/resistivity/sigma joint-inversion (magenta curves) overlaid on the results of the resistivity-sigma joint-inversion (graphical method in dash-green and minimization in red and dot-black).

FIG. 8 shows a fluids properties log (right panel) and reconstructed logs (left panel). The rightmost track shows Rw from the joint-inversion of density/HI/sigma/resistivity (cyan) and Rw the joint-inversion of resistivity/sigma (blue).

Figure 9A:
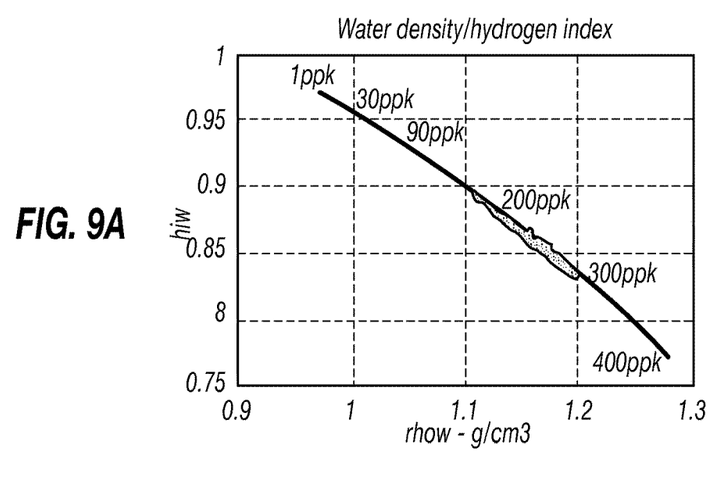
FIGS. 9A through 9D show examples of hydrocarbons that do not follow a simple parameterization.
Figure 9B:
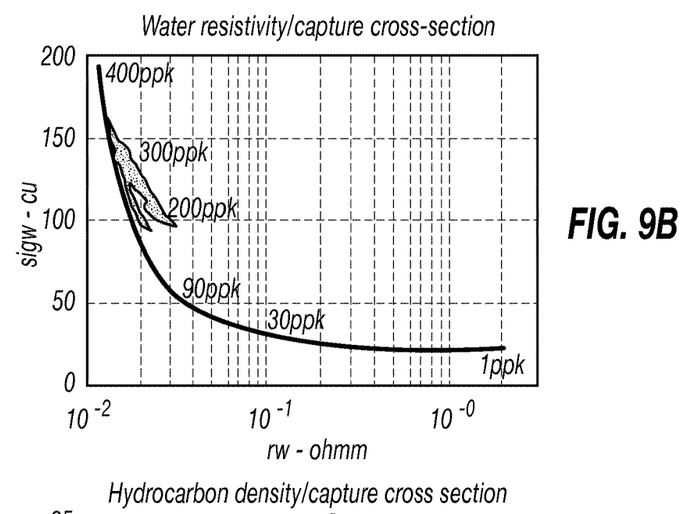
Figure 9C:
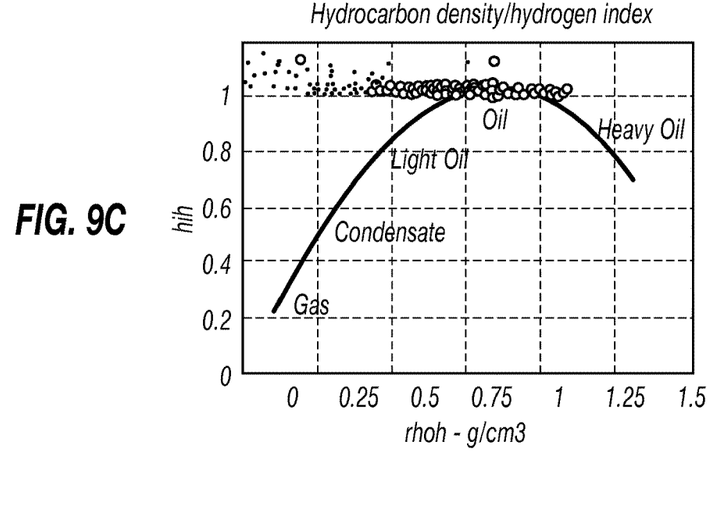
Figure 9D:
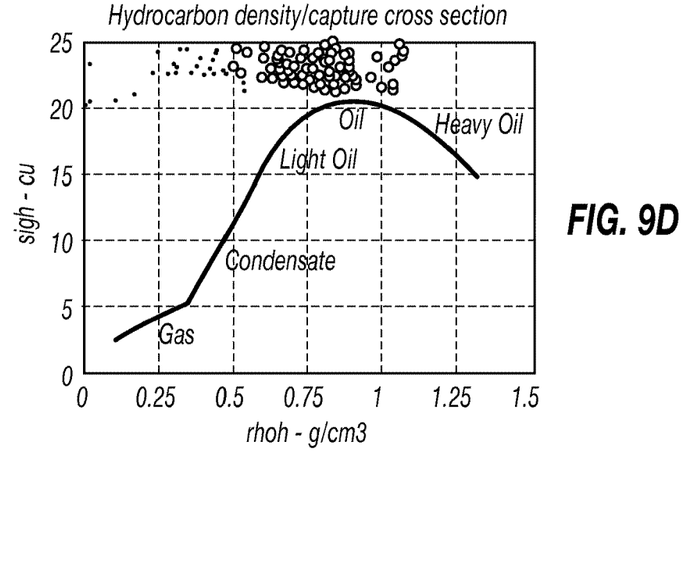

An example of hydrocarbons that do not follow a simple parameterization is shown in FIGS. 9C and 9D. The hydrocarbon is identified as oil. However, it does not follow the parameterized curves in the figures. The oil properties computed by the sequential workflow are shown by the circles in FIGS. 9C and 9D. In FIGS. 9A and 9B, the deviation of the water properties is attributed to temperature and pressure effects.

As will be understood by those skilled in the art, the various techniques described above and relating to estimating fluid properties from well logs obtained within a subsurface Earth formation are provided herein as example embodiments. Accordingly, it should be understood that the present disclosure should not be construed as being limited to only the examples provided above. Further, it should be appreciated that the techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the techniques described herein may be implemented on a downhole processor (e.g., a processor that is part of a downhole logging tool, such as tool 50 of FIG. 2), such that the inversion processing is performed downhole, with the results sent to the surface by any suitable telemetry technique. Additionally, in other embodiments, log measurements may be transmitted uphole via telemetry, and the estimation techniques described herein may be performed uphole on a surface computer (e.g., one that is part of control system 152 in FIG. 1).

It will be appreciate by those skilled in the at that the foregoing parameterization of the formation fluid and inversion to determine fluid properties may be performed for each depth position within the wellbore for which formation characteristics are calculated using, e.g., the control system shown at 152 in FIG. 1. This, the fluid characterization may be performed on a substantially continuous basis, rather than being limited to a single value or set of values for entire formation intervals.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

The invention claimed is:

1. A method for estimation of water properties and hydrocarbon properties in a subsurface formation comprising:
   acquiring a plurality of well log measurements of different measurement types from the subsurface formation;
   parameterizing the water properties and the hydrocarbon properties with respect to a selected set of the different measurement types, wherein the water properties are parameterized with respect to a water salinity parameter as dependent on pressure and temperature and the hydrocarbon properties are parameterized with respect to a hydrocarbon density-based parameter as dependent on pressure and temperature; and
   using at least a portion of the well log measurements, performing a simultaneous inversion to determine at least a value for the water salinity parameter and a value for the hydrocarbon density-based parameter, to estimate the water properties and the hydrocarbon properties, and values of water and hydrocarbon fluid volumes, wherein the simultaneous inversion comprises a non-linear constrained, multivariate inversion.

2. The method of claim 1, wherein the plurality of well log measurements comprises resistivity, thermal neutron capture cross-section, density, and hydrogen index.

3. The method of claim 1 wherein parameters of the parameterization comprise density and neutron hydrogen index.

4. The method of claim 1 wherein parameters of the parameterization comprise resistivity and thermal neutron capture cross section.

5. The method of claim 1, wherein the hydrocarbon properties are parameterized with respect to density.

6. The method of claim 1 wherein the simultaneous inversion to estimate the water properties and the hydrocarbon properties is performed at each position at which well log measurements are made.

7. The method of claim 1, wherein the well log measurements comprise hydrogen index (HI), true sigma ($\Sigma$), true resistivity ($R_t$), and density ($\rho_b$); wherein the water properties comprise water sigma ($\Sigma_w$), water density ($\rho_w$), water hydrogen index ($HI_w$), and water resistivity ($R_w$); and wherein the hydrocarbon properties comprise hydrocarbon sigma ($\Sigma_h$), hydrocarbon density ($\rho_h$), and hydrocarbon hydrogen index ($HI_h$).

8. The method of claim 1, wherein the hydrocarbon density-based parameter is American Petroleum Institute (API) gravity.

9. A system for characterizing subsurface formation fluid content, comprising:
a plurality of well logging sensors each measuring a different physical parameter of the subsurface formation at a plurality of depths of investigation from a wall of a wellbore;
stored in memory, a predetermined set of values of response of each of the well logging sensors to water having a plurality of values of a water salinity parameter and hydrocarbon having a plurality of values of a hydrocarbon density-based parameter; and
a processor programmed to determine volume of water and volume of hydrocarbon in the subsurface formation using measurements from the plurality of well logging sensors and the predetermined sets of values, wherein the processor is programmed to utilize water properties parameterized with respect to the water salinity parameter as dependent on pressure and temperature and hydrocarbon properties parameterized with respect to the hydrocarbon density-based parameter as dependent on pressure and temperature, wherein the processor is programmed to perform a simultaneous inversion of the measurements to determine volume of water and volume of hydrocarbon in the subsurface formation, and wherein the simultaneous inversion comprises a non-linear constrained, multivariate inversion.

10. The system of claim 9 wherein the simultaneous inversion comprises measurements of resistivity, density, hydrogen index and sigma.

11. The system of claim 9 wherein the well logging sensors comprise a resistivity sensor, a neutron based hydrogen index sensor, a gamma-gamma density sensor, a nuclear magnetic resonance sensor and a pulsed neutron sigma sensor.

12. One or more non-transitory computer-readable media comprising computer-executable instructions executable to instruct a computing system to:
acquire a plurality of well log measurements of different measurement types from a subsurface formation;
parameterize water properties and hydrocarbon properties with respect to a selected set of the different measurement types, wherein the water properties are parameterized with respect to a water salinity parameter as dependent on pressure and temperature and the hydrocarbon properties are parameterized with respect to a hydrocarbon density-based parameter as dependent on pressure and temperature; and
using at least a portion of the well log measurements, perform a simultaneous inversion to determine at least a value for the water salinity parameter and a value for the hydrocarbon density-based parameter, to estimate the water properties and the hydrocarbon properties, and values of water and hydrocarbon fluid volumes, wherein the simultaneous inversion comprises a non-linear constrained, multivariate inversion.

13. The one or more non-transitory computer-readable media of claim 12, wherein the well log measurements comprise hydrogen index (HI), true sigma ($\Sigma$), true resistivity ($R_t$), and density ($\rho_b$); wherein the water properties comprise water sigma ($\Sigma_w$), water density ($\rho_w$), water hydrogen index ($HI_w$), and water resistivity ($R_w$); and Wherein the hydrocarbon properties comprise hydrocarbon sigma ($\Sigma_h$), hydrocarbon density ($\rho_h$), and hydrocarbon hydrogen index ($HI_h$).

* * * * *